United States Patent
Jeong

(10) Patent No.: US 6,944,223 B2
(45) Date of Patent: Sep. 13, 2005

(54) EFFECTIVE ERROR RECOVERY METHOD USING PACKET LOSS RATE OF NETWORKS IN REALTIME VIDEO TRANSFER SYSTEM

(75) Inventor: Yeong An Jeong, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 523 days.

(21) Appl. No.: 10/098,794

(22) Filed: Mar. 14, 2002

(65) Prior Publication Data

US 2002/0159525 A1 Oct. 31, 2002

(30) Foreign Application Priority Data

Mar. 15, 2001 (KR) ................................. 10-2001-0013424

(51) Int. Cl.[7] ............................................... H04N 7/12
(52) U.S. Cl. ............................................... 375/240.12
(58) Field of Search ..................... 375/240.01, 240.12, 375/240.2, 240.18, 240.24

(56) References Cited

U.S. PATENT DOCUMENTS 6,151,636 A * 11/2000 Schuster et al. ............ 709/247
2001/0026677 A1 * 10/2001 Chen et al. .................... 386/68
2002/0172283 A1 * 11/2002 Kawakatsu et al. ..... 375/240.13
2003/0031128 A1 * 2/2003 Kim et al. ................... 370/229
2004/0114684 A1 * 6/2004 Karczewicz et al. ... 375/240.03

* cited by examiner

Primary Examiner—Chris Kelley
Assistant Examiner—Behrooz Senfi
(74) Attorney, Agent, or Firm—Lee, Hong, Degerman, Kang & Schmadeka

(57) ABSTRACT

An error recovery method of a video transfer system includes the steps of: setting a refresh rate on the basis of a packet loss rate of a video frame; and encoding a macroblock of the video frame in an intra mode according to the set refresh rate. Since the effective intra encoding method in consideration of the packet loss rate is provided, the image state of the receiving party can be taken into consideration and a mobile image service of a high picture quality can be provided on a real time basis. In addition, since the error recovery method of a video transfer system of the present invention has the flexible refresh rate considering the image state (the picture quality state) of the receiving party, it is suitable for the error recovery method for a high picture quality video transferring.

12 Claims, 2 Drawing Sheets

$$\text{REFRESH\_RATE} = \text{INT}\left[-\left(\frac{132}{100}\right) \times \text{PLR}\right] + 132$$

```
For Initializing
MB_refresh[MB_num]=RANDOM(0,REFRESH_RATE)

IF(REFRESH_RATE<66)
{
 IF(MODE_INTRA || MODE_INTER_CODED || MODE_INTER_NOT_CODED)
   {
       MB_refresh[MB_num] ++
   }
}
ELSE
{
  IF((Mode=MODE_INTRA) || (Mode=MODE_INTER_CODED))
    {
       MB_refresh[MB_num] ++
    }
}
```

EFFECTIVE ERROR RECOVERY METHOD USING PACKET LOSS RATE OF NETWORKS IN REALTIME VIDEO TRANSFER SYSTEM

BACKGROUND OF THE INVENTION

1. Field of the Invention

The present invention relates to a video transfer system, and more particularly, to an error recovery method of a video transfer system that is capable of preventing a disturbance of a picture quality caused due to a packet delay and a packet loss.

2. Description of the Background Art

In general, when a mobile image is provided for service on a real time basis through the Internet by using an instrument such as a video phone, a packet delay and a packet loss takes place due to a non-isochronous nature of the Internet, and accordingly, a phenomenon occurs that an image of a frame of the receiving party is broken.

The image-damaging phenomenon can be solved to a degree by a post-processing, that is, an error concealment, at the receiving party, but without a method for fundamentally recovering an error, it is difficult to provide a high quality real-time based mobile image service.

In an effort to over come the problem of the mobile image service due to the error concealment, there have been proposed error recovery methods such as a re-transmission of a mobile image or a forward error correction. However, these methods are not suitable for a real time processing because they cause a long packet delay time. That is, these methods can't be adopted to such an instrument of a video phone.

On the other hand, there has been also provided an intra coding method in which when macro-blocks having a coefficient are transmitted in a general H.263 standard defined as international standard systems of video compression encoding, the macro-block is forcefully encoded in an inter mode (a predictive frame encoding mode) for minimum every 123rd. Encoding the macro-block in an "intra" mode is called an "intra" update.

An original purpose of the intra encoding method was to prevent accumulation of a mismatch of an inverse discrete cosine transform (IDCT).

But owing to its characteristics that it is not necessary to refer a previous picture, it has been adopted to a system using the most predictive video encoding, so as to be used as an alternative to restore an error or remove a propagation of a temporal error.

However, the conventional intra encoding method has the following problem.

That is, since it considers only a situation with no packet loss, that is, a situation without an error, the intra encoding method is not proper to be adopted to a video transfer system (the video phone) as it is in the aspect of an effective error restoration.

In addition, in case of a video transfer system adopting the conventional intra encoding method has a problem that, in case of a quick motion or when a scene is changed, if an image block is broken to be come a background region (that is, a not coded block), the background region is not intra-updated.

That is, the when the macro-block with a coefficient is transmitted, the macro-block can not be forcefully encoded in an intra mode for every 132nd at minimum.

Moreover, since a video transfer system adopting the conventional intra encoding method has a fixed refresh rate irrespective of an image state (a picture quality state) of the receiving party, it is not suitable as an error restoration method for a high quality video transfer.

SUMMARY OF THE INVENTION

Therefore, an object of the present invention is to provide an error recovery method of a video transfer system that is capable of providing a mobile image of an excellent picture quality on a real time basis by controlling a refresh rate in consideration of a packet loss rate of a video frame and an image state of a receiving party.

To achieve these and other advantages and in accordance with the purpose of the present invention, as embodied and broadly described herein, there is provided an error recovery method of a video transfer system including the steps of: setting a refresh rate on the basis of a packet loss rate of a video frame; and encoding a macro-block of the video frame in an intra mode according to the set refresh rate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Instead of a method of refreshing every 132th blocks with a coefficient when the blocks with a coefficient are transferred, an error recovery method of a video transfer system that is capable of considering a packet loss rate of a video frame and an image state of a receiving party and capable of providing a mobile image of an excellent picture quality on a real time basis will now be described with reference to FIGS. 1 through 3.

Figures 1, 2:
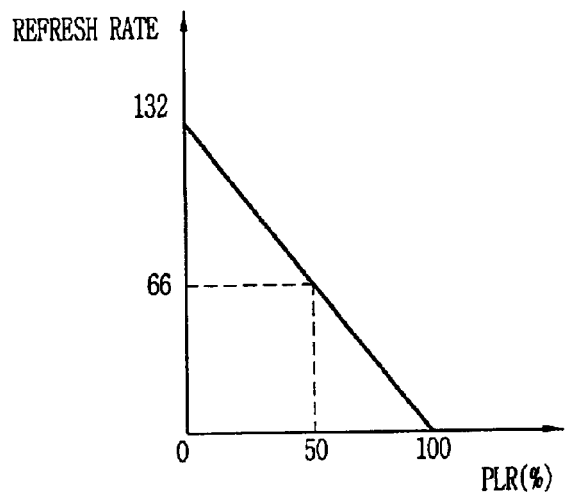
FIG. 1 is a graph showing an adaptive intra refresh rate in consideration of a packet loss rate of a video frame in accordance with a preferred embodiment of the present invention.
FIG. 2 is a drawing illustrating an algorithm of a method for counting macro-blocks in accordance with the preferred embodiment of the present invention.

FIG. 1 is a graph showing an adaptive intra refresh rate in consideration of a packet loss rate of a video frame in accordance with a preferred embodiment of the present invention.

As shown in FIG. 1, as a packet loss rate (PLS) of a video frame is greater, an intra refresh rate becomes linearly small.

That is, as the packet loss rate (PLR) of a video frame becomes greater, the refresh rate is linearly small, so that an intra update rate is heightened.

For example, if a packet loss rate is 9% (that is, if there is no error), a refresh ratio is 132 (that is, when the 132th macro-block is transmitted, it is refreshed). If a packet loss rate is 50%, a refresh rate is 66 (that is, in case of 66th macro-block transmission, it is refreshed). If a packet loss rate 9s 100%, a refresh rate is 0.

In case of the 100% packet loss rate that every packet disappear, every macro-block is encoded in an intra mode.

In addition, in case of counting macro-blocks in an intra mode for refreshing, in the past, a count value of macro-blocks in the intra mode and a count value of macro-blocks in an inter mode having a coefficient (that is, a CODED block) were increased one by one.

However, comparatively, in the present invention, if the refresh rate is experimentally smaller than 66, that is, if a packet loss rate (PLR) is greater than 50%, macro-blocks in an inter (that is, NOT CODED) mode without a coefficient are counted and when the count value reaches a reference refresh rate, the macro-block in the inter mode is encoded.

In other words, if the packet loss rate (PLR) is greater than 50%, macro-blocks in an inter (that is, NOT CODED) mode with a coefficient are counted and when the count value reaches the reference refresh rate, the macro-blocks in the inter mode are encoded in an intra mode, so that a propagation of an error for the background region (NOT CODED block) (that is, an error block remains as a background region) in case of a great packet loss rate (PLR) can be prevented.

Meanwhile, in case that the packet loss rate (PLR) is smaller than 50%, a block without a coefficient (a background region) is not counted, so that the encoding efficiency (the encoding bit is increased in case of the intra update) is improved.

In addition, incase that the packet loss late (PLR) is smaller than 50%, a background region (a block with a coefficient) is not counted, so that a phenomenon that the background portion is blinking owing to the intra update can be prevented.

Though the macro-block (MB) refresh counting method is not defined in the H.263 standard, in the present invention, the macro-block is counted by using a random function so as to improve an efficiency of an error restoration. This will now be described with reference to FIG. 2.

FIG. 2 is a drawing illustrating an algorithm of a method for counting macro-blocks in accordance with the preferred embodiment of the present invention.

As shown in FIG. 2, a random value between a minimum value (0) and a maximum (132) is selected as an initial value of the random function, in order to set a refresh rate.

Namely, by using a random value between '0' and 132 as an initial value, the macro-blocks within a video frame are randomly updated, rather than being sequentially updated, so that the picture quality can be improved.

Figure 3:
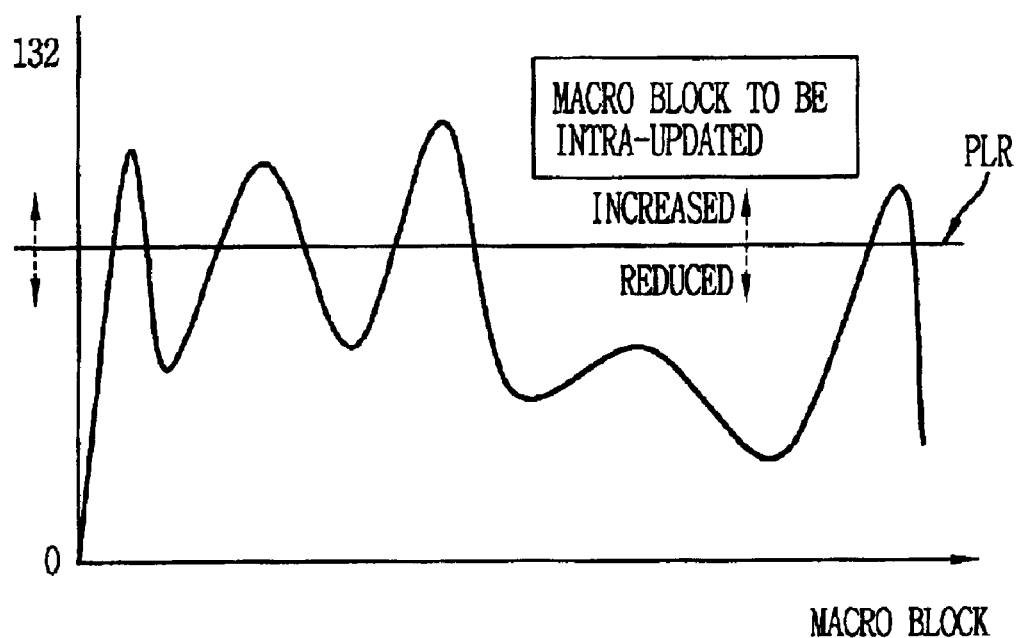
FIG. 3 is a graph showing an error recovery method of a video transfer system in accordance with the preferred embodiment of the present invention.

FIG. 3 is a graph showing an error recovery method of a video transfer system in accordance with the preferred embodiment of the present invention.

As shown in FIG. 3, a packet loss rate (PLR) of the video frame is set, and the set packet loss rate (PLR) is substituted for the below equation 1 to control a refresh rate. The packet loss rate (PLR) is transmitted from the receiving party.

$$\text{REFRESH\_RATE} = INT\left[-\left(\frac{132}{100}\right) \times PLR\right] + 132 \qquad \text{equation (1)}$$

wherein INT is an integer and the PLR is a packet loss rate. That is, if the packet loss rate (PLR) is high, the refresh rate is controlled to be small, so that the number of macro-blocks to be intra-updated is increased.

Accordingly, the propagation of error can be adaptively prevented according to the packet loss rate (PLR), and at the same time, the error restroation (that is, the macro-blocks are counted by using the random function) is performed to thereby improve the picture quality.

As so far described, the error recovery method of a video transfer system of the present invention has many advantages.

That is, for example, since the effective intra encoding method in consideration of the packet loss rate is provided, the image state of the receiving party can be taken into consideration and a mobile image service of a high picture quality can be provided on a real time basis.

In addition, since the error recovery method of a video transfer system of the present invention has the flexible refresh rate considering the image state (the picture quality state) of the receiving party, it is suitable for the error recovery method for a high picture quality video transferring.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. An error recovery method of a video transfer system comprising the steps of:

setting a refresh rate on the basis of a packet loss rate of a video frame; and encoding a macro-block of the video frame in an intra mode according to the set refresh rate;

wherein the refresh rate is set by using the following equation:

$$\text{REFRESH\_RATE} = INT\left[-\left(\frac{132}{100}\right) \times PLR\right] + 132,$$

wherein INT is an integer and PLR is a packet rate.

2. An error recovery method of a video transfer system comprising the steps of:

adaptively setting an intra refresh rate on the basis of a packet loss rate of a video frame; and counting macro-blocks without a coefficient when the packet loss rate is above a certain value, and encoding the blocks in an intra mode when the count value reaches a reference packet loss rate;

wherein the refresh rate is set by using the following equation:

$$\mathrm{REFRESH\_RATE} = INT\left[-\left(\frac{132}{100}\right) \times PLR\right] + 132,$$

wherein INT is an integer and PLR is a packet loss rate.

3. An error recovery method of a video transfer system comprising the steps of:
   setting an intra refresh rate on the basis of a packet loss rate of a video frame transmitted from a receiving party;
   counting macro-blocks in an inter mode without a coefficient when the packet loss rate is above a certain value, and encoding the block in an intra mode when the count value reaches a reference packet loss rate; and
   omitting the operation of counting the macro-blocks in the inter mode without a coefficient when the packet loss rate is below a certain value;
   wherein the refresh rate is set by using the following equation:

$$\mathrm{REFRESH\_RATE} = INT\left[-\left(\frac{132}{100}\right) \times PLR\right] + 132,$$

wherein INT is a integer and PLR is a packet loss rate.

4. The method of claim 3, wherein the omitting of the counting operation is performed to heighten an encoding efficiency and prevent a blinking phenomenon that a background portion on the screen blinks due to an inter update.

5. The method of claim 4, wherein the refresh rate is linearly set according to a packet loss rate of the video frame.

6. The method of claim 4, wherein the certain value is 50%.

7. The method of the claim 4, wherein the refresh rate is set by selecting a random value between '0' and a maximum value as an initial value of a random function.

8. The method of claim 4, wherein the refresh rate is set to prevent a phenomenon that the macro-blocks are sequentially updated, and to update the macro-blocks randomly.

9. An error recovery method of a video transfer system in which when macro-blocks with a coefficient are transmitted, every 132th macro-block at minimum is forcefully encoded in an intra mode, comprising the steps of:
   setting an intra refresh rate on the basis of a packet loss rate of a video frame transmitted from a receiving party; and
   counting macro-blocks in an inter mode without a coefficient when the packet loss rate is above a certain value, and encoding the macro-blocks into an intro mode when the count value reaches a reference packet loss rate;
   wherein the refresh rate is set by using the following equation:

$$\mathrm{REFRESH\_RATE} = INT\left[-\left(\frac{132}{100}\right) \times PLR\right] + 132,$$

wherein INT is an integer and PLR is a packet loss rate.

10. An error recovery method of a video transfer system in which when macro-blocks with a coefficient are transmitted, every 132th macro-block at minimum is forcefully encoded in an intra mode, comprising the steps of:
   linearly setting an intra refresh rate on the basis of a packet loss rate of a video frame transmitted form a receiving party;
   counting macro-blocks in an inter mode without a coefficient when the packet loss rate is above a certain value, and encoding the macro-blocks into an intro mode when the count value reaches a reference packet loss rate; and
   omitting the operation of counting the macro-blocks in the inter mode without a coefficient when the packet loss rate is above a certain value,
   wherein the refresh rate is set by using the following equation:

$$\mathrm{REFRESH\_RATE} = INT\left[-\left(\frac{132}{100}\right) \times PLR\right] + 132,$$

wherein INT is an integer and PLR is a packet loss rate.

11. The method of claim 10, wherein the certain value is 50%.

12. The method of claim 10, wherein the refresh rate is set by selecting a random value between '0' and 132 as an initial value of a random function.

* * * * *